US008567712B2

(12) United States Patent
Porte et al.

(10) Patent No.: US 8,567,712 B2
(45) Date of Patent: Oct. 29, 2013

(54) FUSE LINK DEVICE BETWEEN A MOBILE PART AND A FIXED PART OF AN AIRCRAFT NACELLE

(75) Inventors: Alain Porte, Colomiers (FR); Jacques Lalane, Saint Orens de Gameville (FR); Franck Alvarez, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 175 days.

(21) Appl. No.: 13/008,592

(22) Filed: Jan. 18, 2011

(65) Prior Publication Data
US 2011/0174930 A1    Jul. 21, 2011

(30) Foreign Application Priority Data
Jan. 20, 2010    (FR) ...................... 10 50344

(51) Int. Cl.
*B64D 29/00* (2006.01)
*B64D 29/08* (2006.01)

(52) U.S. Cl.
USPC ...................... 244/53 R; 244/129.4

(58) Field of Classification Search
USPC .............. 244/129.4, 129.5, 53 R, 54, 110 B
See application file for complete search history.

(56) References Cited

U.S. PATENT DOCUMENTS

| | | | |
|---|---|---|---|
| 4,147,029 A | 4/1979 | Sargisson | |
| 4,283,028 A | 8/1981 | Wilke | |
| 4,859,143 A * | 8/1989 | Larrabee et al. | ............... 415/142 |
| 5,157,915 A | 10/1992 | Bart | |
| 5,603,471 A * | 2/1997 | Armstrong | ................ 244/110 B |
| 6,170,252 B1 * | 1/2001 | Van Duyn | ......................... 60/796 |
| 6,334,588 B1 * | 1/2002 | Porte | ............................ 244/129.4 |
| 7,334,393 B2 * | 2/2008 | Porte | ............................ 60/226.1 |
| 7,631,408 B2 * | 12/2009 | Green | .......................... 29/407.05 |

FOREIGN PATENT DOCUMENTS

| | | |
|---|---|---|
| EP | 0453360 A1 | 10/1991 |
| GB | 2259954 A | 3/1993 |

OTHER PUBLICATIONS

French Search Report, dated Aug. 9, 2010, from corresponding French application.

* cited by examiner

*Primary Examiner* — Tien Dinh
*Assistant Examiner* — Richard R Green
(74) *Attorney, Agent, or Firm* — Young & Thompson

(57) ABSTRACT

The object of the invention is an aircraft nacelle that comprises at least one part, called a door (14), that moves relative to a stationary part (20) and a connecting device that makes it possible to limit the offset between said door and said stationary part in a direction that corresponds to the primary direction of the flow of air outside of the nacelle during flight, whereby said device comprises, on the one hand, an indexer (40) that is connected to the door (14) that comprises an attachment surface (63) and at least one attachment element (66), and, on the other hand, at least one stop (58) that is connected to the stationary part (20) against which said indexer (40) can rest in such a way as to limit its movement in said direction, characterized in that said at least one attachment element (66), oriented in the radial direction, is arranged upstream from the stop (58) in said direction, said at least one stop (58) comprising a surface relative to the door arranged essentially at the attachment surface (63) of the indexer (40).

12 Claims, 4 Drawing Sheets

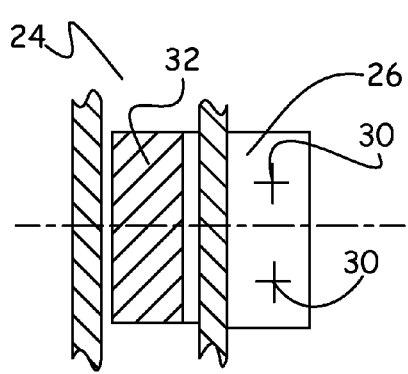
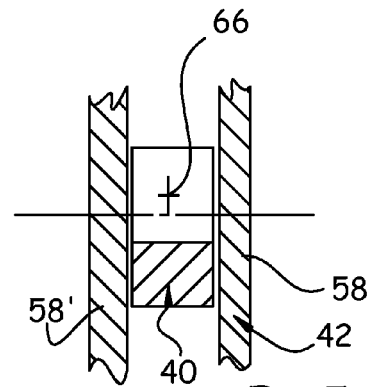
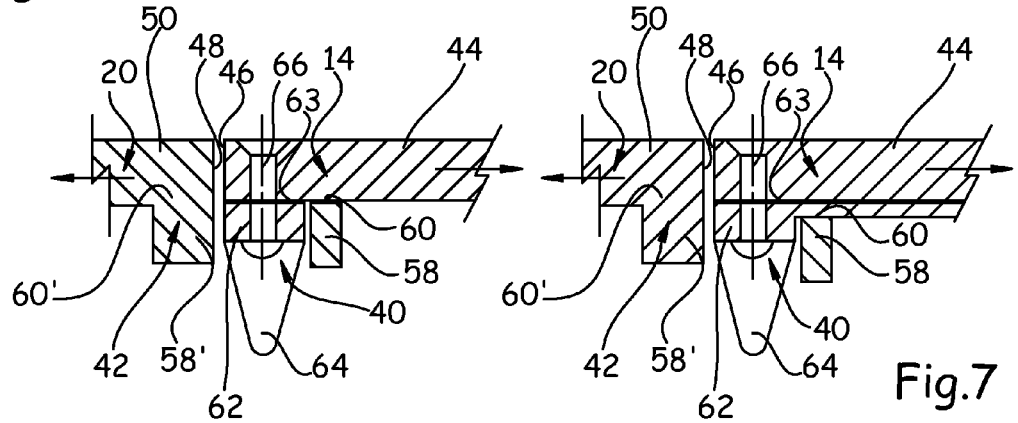
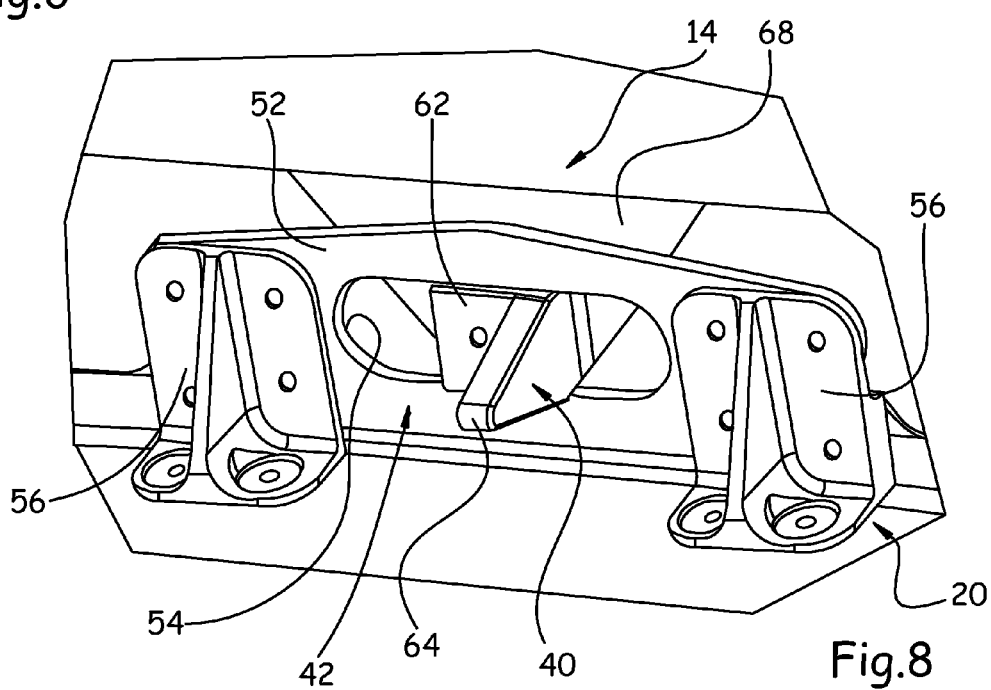

FUSE LINK DEVICE BETWEEN A MOBILE PART AND A FIXED PART OF AN AIRCRAFT NACELLE

This invention relates to a device for weak-point connection between a moving part and a stationary part of an aircraft nacelle, more particularly between a door and the other parts of the nacelle.

Figure 1:
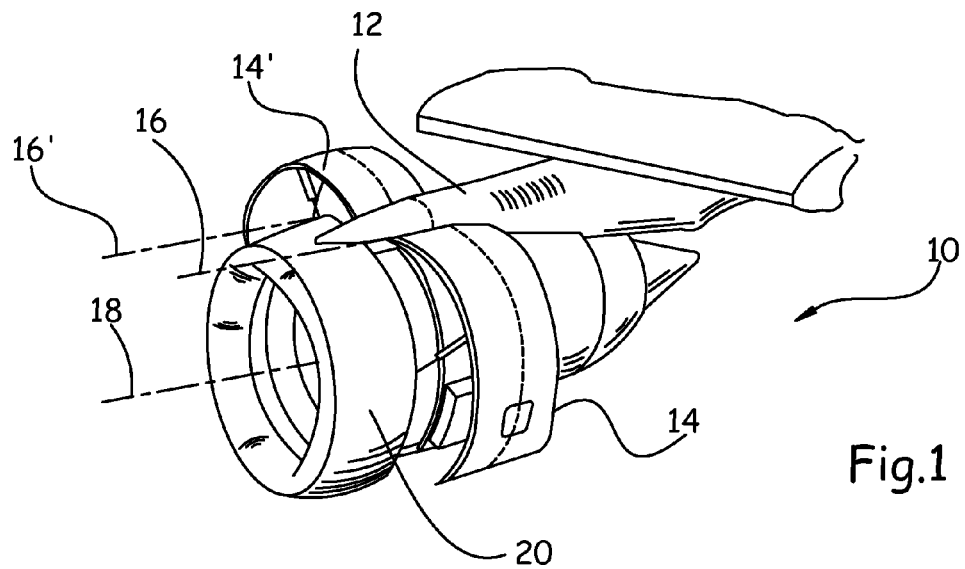
Figure 2:
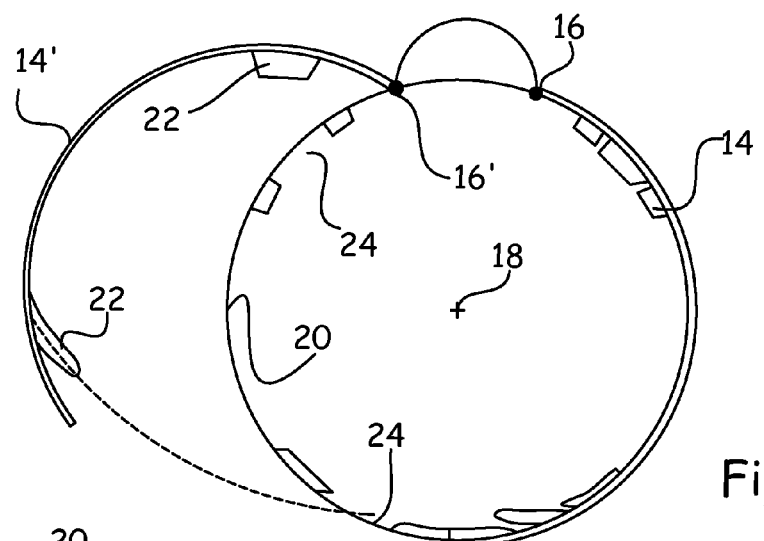

As illustrated in FIGS. 1 and 2, the power plant of an aircraft is integrated in the interior of a structure, called nacelle 10 below, connected by connecting means to the aircraft, in particular by a mast 12 to the wing.

This nacelle has several functions, in particular those of regulating and controlling the movements of the air around and in the engine so as to optimize the aerodynamic streams, to protect the engine from the outside elements, to minimize noise pollution, to ventilate internal zones, to participate in the distribution of mechanical forces from the engine and optionally to support thrust reverser systems.

Finally, the nacelle is to enable daily maintenance and upkeep of the engine and its components.

For this purpose, at its outer surface, the nacelle comprises an opening that allows access to the interior of the nacelle and a moving part 14 that can occupy at least two positions, a so-called first closed position, to the right in FIG. 2 in which said moving part is arranged in the extension of the outside surface of the nacelle so as to block said opening, and a second position in which it releases the opening at least partially, in FIG. 1 or to the left in FIG. 2.

Hereinafter, the moving part 14 is called a door.

In general, the nacelle 10 comprises two symmetrical doors 14, 14' that are articulated around pivoting axes 16, 16' that are parallel to the longitudinal axis 18 of the nacelle, arranged on both sides of the mast 12.

According to this configuration, the lower edges of the doors 14, 14' are essentially contiguous in the closed position and held in this position by locking mechanisms that are distributed along the lower edges of the doors.

During flight, the different parts of the nacelle, in particular the door 14 and the stationary part 20 upstream, undergo stresses that tend to offset them from one another in the longitudinal direction.

However, it is important that air does not pass between the stationary part and the door so as not to produce a scooping phenomenon that can interfere with the aerodynamic performances of the aircraft and/or to put excessive stress on the locking mechanisms of the door.

To limit the relative movement in the longitudinal direction between the door and the stationary part of the nacelle that is arranged upstream, the door—at its surface oriented toward the interior of the nacelle and close to its upstream edge—comprises at least one indexer 22, also called a knife, that can be housed in a housing 24 that is made at the corresponding edge of the stationary part 20. In general, as illustrated in FIG. 2, the door 14 comprises several indexers 22 that are arranged between the pivoting axis of the door and its lower edge.

Figure 3:
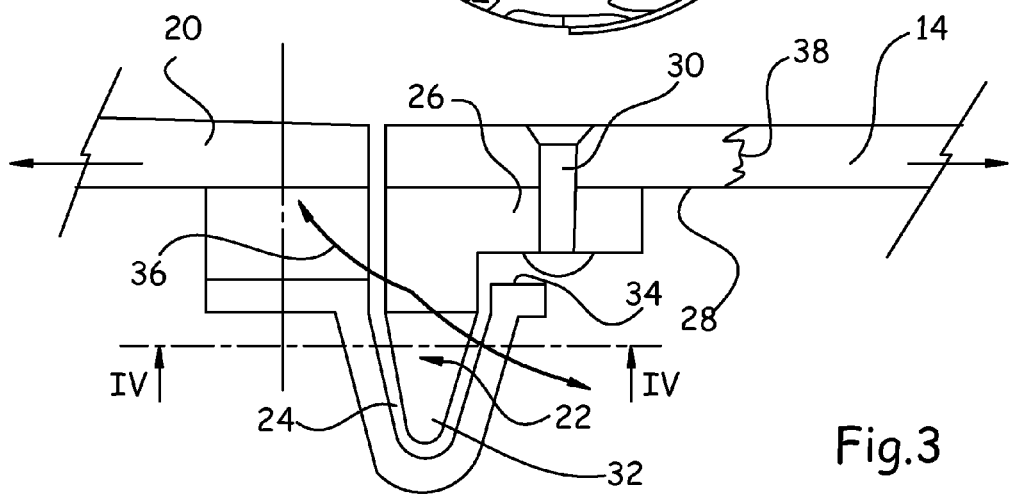

As illustrated in detail in FIGS. 3 and 4, an indexer 22 comprises an L-shape with a base 26 that is flattened against the inside surface 28 of the door and is made integral by rivets 30 with said door and a projecting element 32 in the form of a pin.

In addition, the stationary part comprises a housing 24 whose shapes work with those of the projecting element 32. According to one embodiment, this housing is obtained from a plate that offers a support surface 34 that is essentially parallel to the base 26 of the indexer in which a cutout is made in such a way as to obtain a hole that provides the housing function or a fold in such a way as to obtain a hollow that provides the housing function. According to this arrangement, the plate that comprises the housing 24 is offset from the inside surface 28 of the door because of the presence of the base 26 of the indexer.

Normally, the rivets 30 are sized in such a way as to ensure the weak-point function and to prevent the door from deteriorating in the case of excessive accidental stresses.

This type of assembly may be suitable when the door is metallic.

However, it is different when the piece is made of composite material.

Actually, considering the arrangement of the different elements and in particular the offset of the plate that comprises the housing 24 relative to the inside surface 28 of the door, stresses develop in the form of flexion (indicated by the double arrow 36) that are difficult to support by a panel made of composite material. Thus, in the case of excessive accidental stresses, the wall of the door that is made of composite material tends to break along a line 38 that is offset relative to the indexer 22 in place of the rivets that no longer play their role of weak points. However, the changing of the door takes longer and is more expensive than the changing of one or more indexers 22 or their attachments.

Also, the purpose of this invention is to eliminate the drawbacks of the prior art by proposing a connecting device between a door and the remainder of an aircraft nacelle that tends to reduce the risks of the door being damaged.

For this purpose, the invention has as its object an aircraft nacelle that comprises at least one part, called a door, that moves relative to a stationary part and a connecting device that makes it possible to limit the offset between said door and said stationary part in a direction that corresponds to the primary direction of the flow of air outside of the nacelle during flight, whereby said device comprises, on the one hand, an indexer that is connected to the door that comprises an attachment surface and at least one attachment element, and, on the other hand, at least one stop that is connected to the stationary part against which said indexer can rest in such a way as to limit its movement in said direction, characterized in that said at least one attachment element, oriented in the radial direction, is arranged upstream from the stop in said direction, said at least one stop comprising a surface relative to the door arranged essentially at the attachment surface of the indexer.

Figure 9:
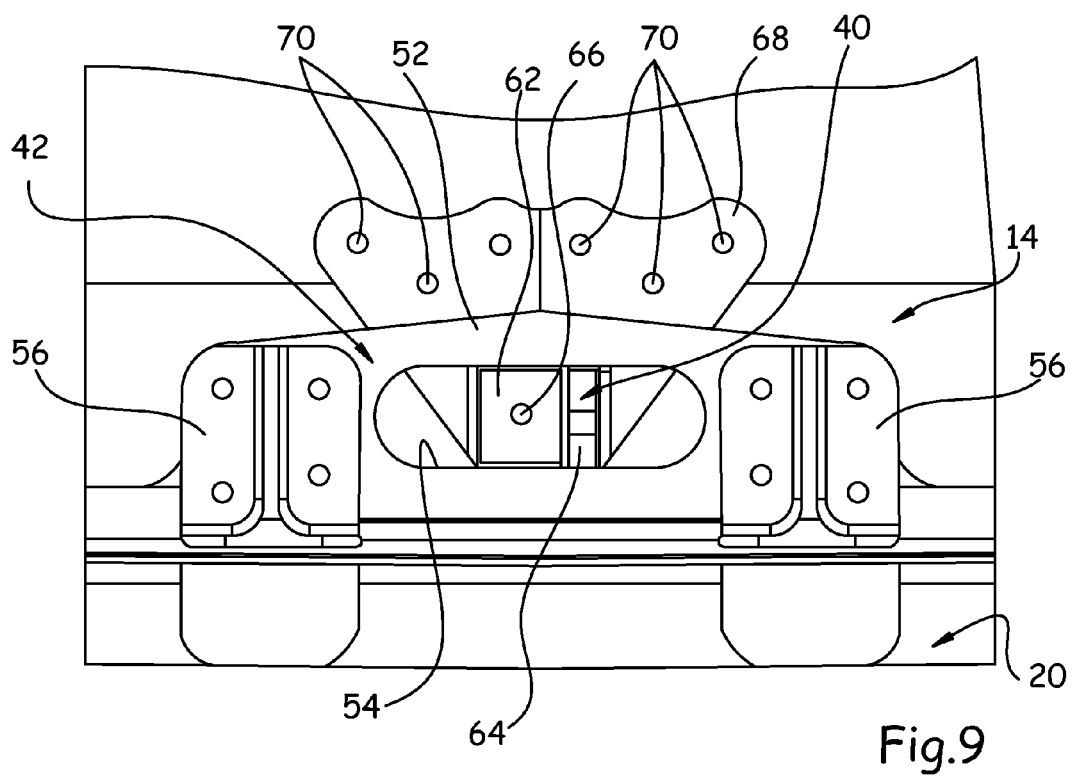
Figure 10:
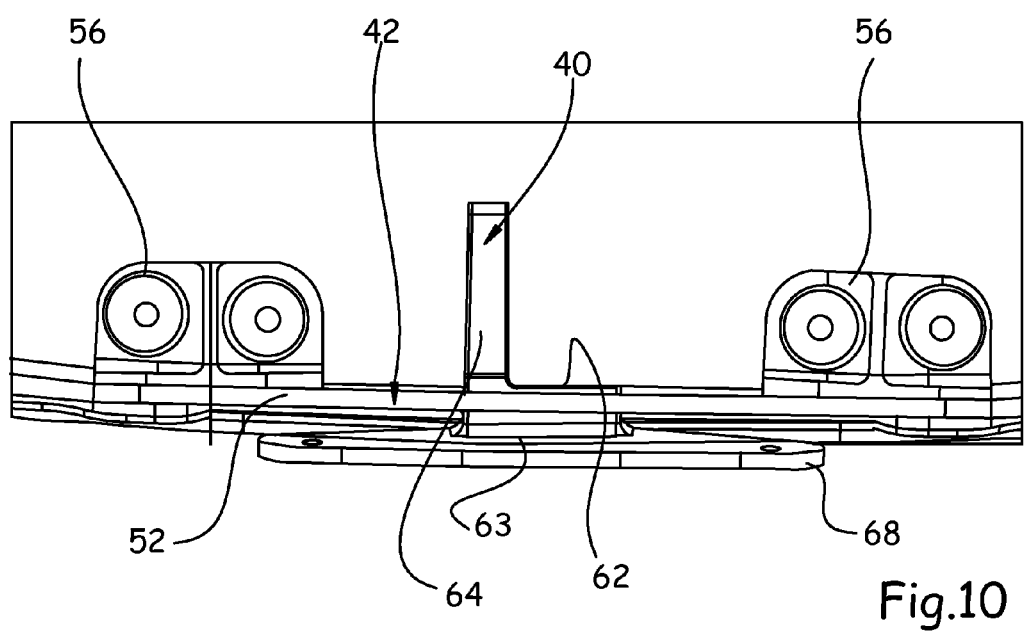
Figure 11:
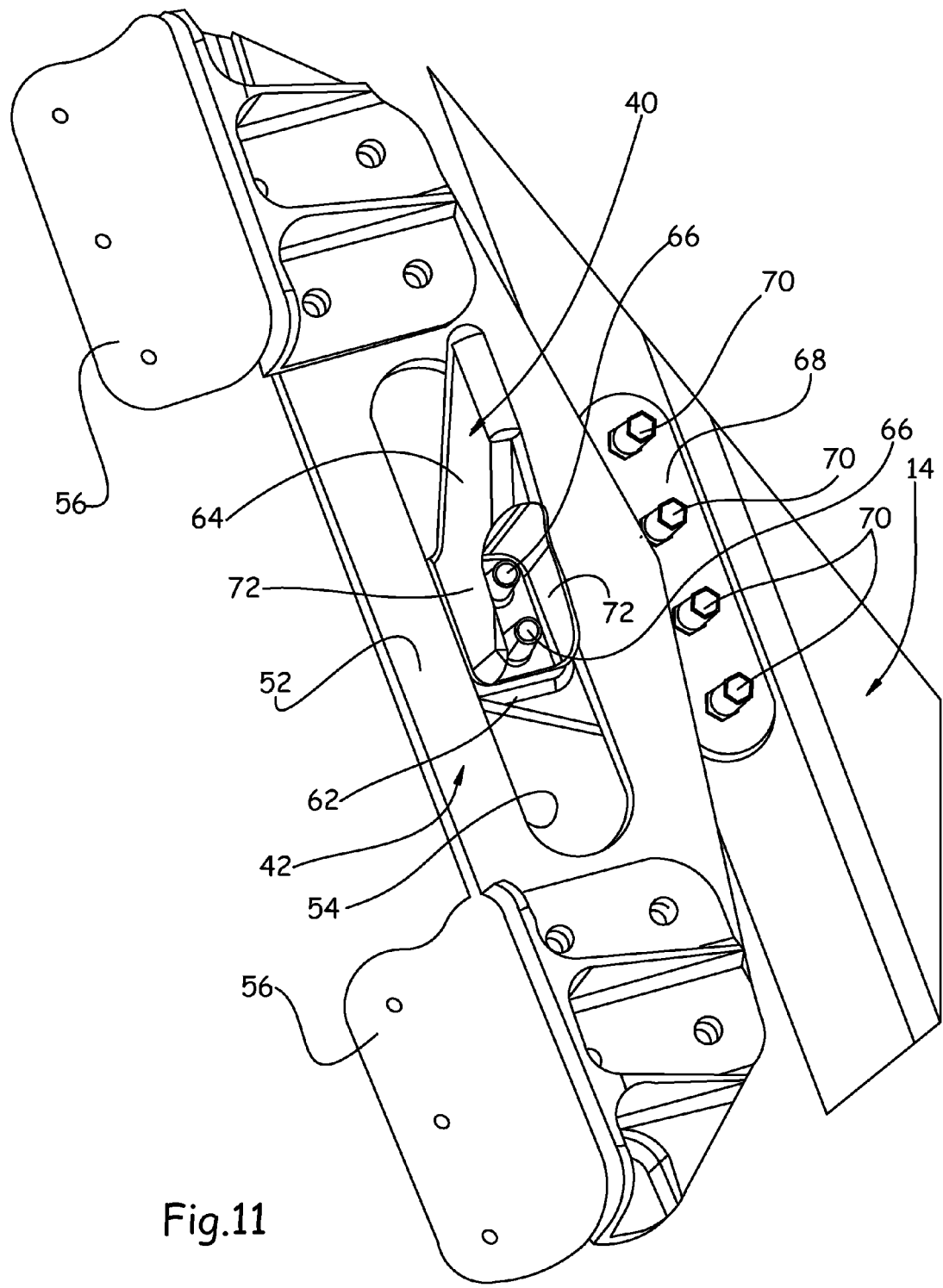

Other characteristics and advantages will emerge from the following description of the invention, a description that is provided only by way of example, relative to accompanying drawings in which:

FIG. 1 is a perspective view of an aircraft nacelle with doors in the open position, FIG. 2 is a diagram that illustrates an aircraft nacelle with an open door and a closed door, FIG. 3 is a cutaway that illustrates in detail a connecting device between a door and the stationary part upstream from the nacelle according to the prior art, FIG. 4 is a cutaway along line IV-IV of FIG. 3, FIG. 5 is a cutaway along a plane that is parallel to the door that illustrates diagrammatically a connecting device between a door and the stationary part upstream from the nacelle according to the invention, FIG. 6 is a cutaway along a plane that is perpendicular to the plane of the door of the device of the invention, FIG. 7 is a cutaway along a plane that is perpendicular to the plane of the door of a device of the invention according to another variant, FIG. 8 is a perspective view of a device according to a first variant of the invention, FIG. 9 is a top view of the device that is illustrated in FIG. 8, FIG. 10 is a side view of the device that is illustrated in FIG. 8, and FIG. 11 is a perspective view of a device according to another variant of the invention.

The invention relates more particularly to a connecting device between a door 14 and the stationary part 20 of an aircraft nacelle that makes it possible to limit the relative movement between these two elements in the longitudinal direction that corresponds essentially to the primary direction of the flow of air outside of the nacelle during flight.

This connecting device comprises, on the one hand, a male element that is also called an indexer or knife 40 that is connected to the door, and, on the other hand, a female part 42 whose shapes are suitable for holding the male element 40 and limiting the relative movement in the direction of the flow of air. Advantageously, the shapes of the female part allow a relative movement of rotation around the longitudinal axis of the nacelle between the two elements.

As a variant, it is possible to consider the male element that is connected to the stationary part and the female part that is connected to the door.

To simplify the explanations, the door 14 comes in the form of a plate 44 that has an edge 46 that is oriented toward the stationary part, arranged upstream from said door 14. Preferably, the plate 44 is made of a composite material.

In addition, the stationary part 20 comprises an upstream edge 48, oriented toward the edge 46 of the door 14 in the form of a plate 50.

According to one embodiment, the female part 42 comprises a plate 52 that is arranged in a plane that is essentially perpendicular to the radial direction (parallel to the door) comprising an opening 54 that can house an indexer 40, whereby said plate is connected to the stationary part 20 by any suitable means. The female part can be connected to the stationary part using brackets 56, connecting elements ensuring the engagement of brackets 56 to the stationary part and brackets 56 to the plate 52. These brackets and said connecting elements can be used to constitute a zone of least resistance that can break in the case of excessive stresses so as to limit the deteriorations of other elements of the connecting device.

According to a minimalist variant, to ensure the limitation of the movement in the direction of the flow of air of the male element 40, the female part 42 comprises at least one stop 58 that is arranged downstream from the indexer relative to the direction of the flow of air that comprises a surface 60 that is oriented toward the door.

In the case of an opening 54, the female part 42 comprises two stops 58, 58' that are separated by a distance E in the direction of the flow of air, each comprising a surface 60, 60' that is oriented toward the door 14, the portion of the edge of the opening that is arranged downstream from the indexer in the longitudinal direction providing the stop function 58 whereas the portion of the edge of the opening that is arranged upstream from the indexer in the longitudinal direction provides the stop function 58'.

The indexer 40 comprises a base 62 of which one surface 63, called an attachment surface, is oriented toward the door 14 and a prominent part 64 that is connected to the surface of the base that is opposite to its attachment surface.

The base 62 and the prominent part 64 are generally made of one piece.

According to the variants, the indexer 40 is attached by one or more attachment elements 66 directly to the door 14 as illustrated in FIGS. 5 to 7 or indirectly by means of an intermediate plate 68, as illustrated in FIGS. 8 to 11, itself attached to the door by secondary attachment means 70.

To ensure its engagement with the door or with the intermediate plate, the indexer comprises at least one through hole whose axis is oriented in the radial direction in which an attachment element 66 that comprises a rod, such as a bolt or a rivet, is housed.

According to the invention, the axis of the through hole(s) provided for the attachment of the indexer 40 is arranged upstream from the stop 58 that limits the movement of the door in the direction of the flow of air. The base 62 of the indexer is thereby arranged upstream from the stop 58 in such a way that the surface 60 of the stop 58 is closest to the attachment surface 63 of the indexer.

When the female part comprises two stops 58, 58' that are separated by an offset E in the direction of the flow of air, the axis of the through hole(s) provided for the attachment of the indexer 40 is arranged between the two stops 58, 58'. The base 62 of the indexer is thereby arranged between the stops 58 and 58' in such a way that the surface 60 of the stop 58 is closest to the attachment surface 63 of the indexer.

This arrangement makes it possible to obtain a resultant of the forces between the male part and the female part arranged essentially in a plane that is parallel to the attachment surface 63 and close to said attachment surface 63. This makes it possible to obtain—for the attachment element(s) 66—essentially shearing stresses at the attachment surface 63. Thus, in the case of excessive accidental stresses, the rod of the attachment element(s) 66 is subjected to shearing stresses at the attachment surface 63 that tend to shear it although the attachment element provides its weak-point function.

As illustrated in FIG. 7, the indexer 40 can comprise a part in the form of a fine plate that is inserted between the door and the stop 58 or 58', whereby the attachment elements 66 ensure the bulk of the uptake of forces between the indexer and the door.

Advantageously, the female part comes in the form of a plate with a small thickness, less than 6 mm, in such a way as to bring the resultant of the forces between the male part and the female part close to the attachment surface 63.

In addition, this arrangement makes it possible to limit the appearance of stresses in the form of torque and to obtain essentially shearing stresses in a plane that is parallel to the plane of the door. These shearing stresses are supported by a door that is made of composite material.

Thus, in the case of an incident, only the indexer or the attachment element is to be changed, which tends to reduce the down time and the repair costs.

According to one embodiment, the indexer 40 comprises a base 62 with a rectangular cross-section on top of which is a prominent part 64 in the form of a plate with a triangular cross-section, of which one side is integral with the base and of which the opposite tip is rounded to promote the guiding of the indexer in its housing.

According to one embodiment, the indexer 40 is connected directly to the door using at least one attachment element.

According to another variant, the indexer 40 is connected to an intermediate plate 68 using at least one attachment element 66, whereby said intermediate plate 68 is connected to the door 14 by one or more attachment elements 70.

According to another characteristic of the invention, the attachment elements 70 have a shearing resistance that is different from that of the attachment element(s) 66 so as to promote a breaking zone, either between the door 14 and the intermediate plate 68 or between the intermediate plate 68 and the indexer 40.

Preferably, this intermediate plate 68 has an approximately triangular cross-section, whereby the indexer is attached to a top, and the elements for attachment to the door are distributed close to the opposite side in such a way as to not concentrate the stresses but to distribute them over a larger surface.

According to its location on the door, the prominent part 64 is essentially perpendicular to the base 62 in particular when the indexer is close to the axis of articulation of the door, as illustrated in FIGS. 2, 8 to 10, or inclined relative to the base 62, in particular when the indexer is far from the axis of articulation of the door, for allowing the penetration of the indexer 40 into its housing during the closing movement of the door, as illustrated in FIG. 11. When the prominent part 64 is inclined, at least one reinforcement 72 can be provided between the base and the prominent part for reinforcing the rigidity of the indexer. In FIG. 11, the indexer comprises two reinforcements 72 between which are provided the through holes of the attachment elements 66.

The invention claimed is:

1. An aircraft nacelle comprising a door that moves relative to a stationary part, and a connecting device that makes it possible to limit the relative displacement between said door and said stationary part in a direction that corresponds to a primary direction of air flow outside of the nacelle during flight, said door being positioned downstream of said stationary part in said direction, said connecting device comprising an indexer connected to the door, said indexer comprising an attachment surface and at least one attachment element, and said connecting device further comprising at least one stop that is connected to the stationary part by a surface perpendicular to said direction and against which said indexer can rest in such a way as to limit movement of said indexer in said direction, said at least one attachment element being oriented radially of said direction and positioned upstream from said at least one stop in said direction, said at least one stop comprising a surface facing said door which is positioned on a line, parallel to said direction, which passes through said at least one attachment element and positioned essentially at the attachment surface of the indexer.

2. The aircraft nacelle according to claim 1, wherein the connecting device comprises a female part with two stops that are separated from one another in said direction and which are configured to limit movement of the indexer in said direction, and wherein said at least one attachment element is positioned between said two stops.

3. The aircraft nacelle according to claim 2, wherein the female part comprises a plate extending in said direction and comprising an opening sized to receive said indexer, said plate having a thickness less than 6 mm.

4. The aircraft nacelle according to claim 3, wherein the plate is connected to the stationary part using brackets and connecting elements that fasten said brackets to the stationary part and to said plate.

5. The aircraft nacelle according to claim 2, wherein the indexer is connected to an intermediate plate using said at least one attachment element, said intermediate plate being connected to the door by one or more further attachment elements.

6. The aircraft nacelle according to claim 1, wherein the female part comprises a plate extending in said direction and comprising an opening sized to receive said indexer, said plate having a thickness less than 6 mm.

7. The aircraft nacelle according to claim 6, wherein the plate is connected to the stationary part using brackets and connecting elements that fasten said brackets to the stationary part and to said plate.

8. The aircraft nacelle according to claim 1, wherein the indexer is connected to an intermediate plate using said at least one attachment element, said intermediate plate being connected to the door by one or more further attachment elements.

9. The aircraft nacelle according to claim 8, wherein the one or more further attachment elements have a shearing resistance that is different from that of said at least one attachment element.

10. The aircraft nacelle according to claim 9, wherein said intermediate plate has an approximately triangular shape, said indexer being attached near an apex of said intermediate plate, said one or more further attachment elements being along an opposite side of said intermediate plate.

11. The aircraft nacelle according to claim 8, wherein said intermediate plate has an approximately triangular shape, said indexer being attached near an apex of said intermediate plate, said one or more further attachment elements being along an opposite side of said intermediate plate.

12. The aircraft nacelle according to claim 1, wherein the door is made of a composite material.

* * * * *